May 19, 1925.
A. C. DAMAN
DRIER
Filed April 24, 1923    3 Sheets-Sheet 1
1,538,385
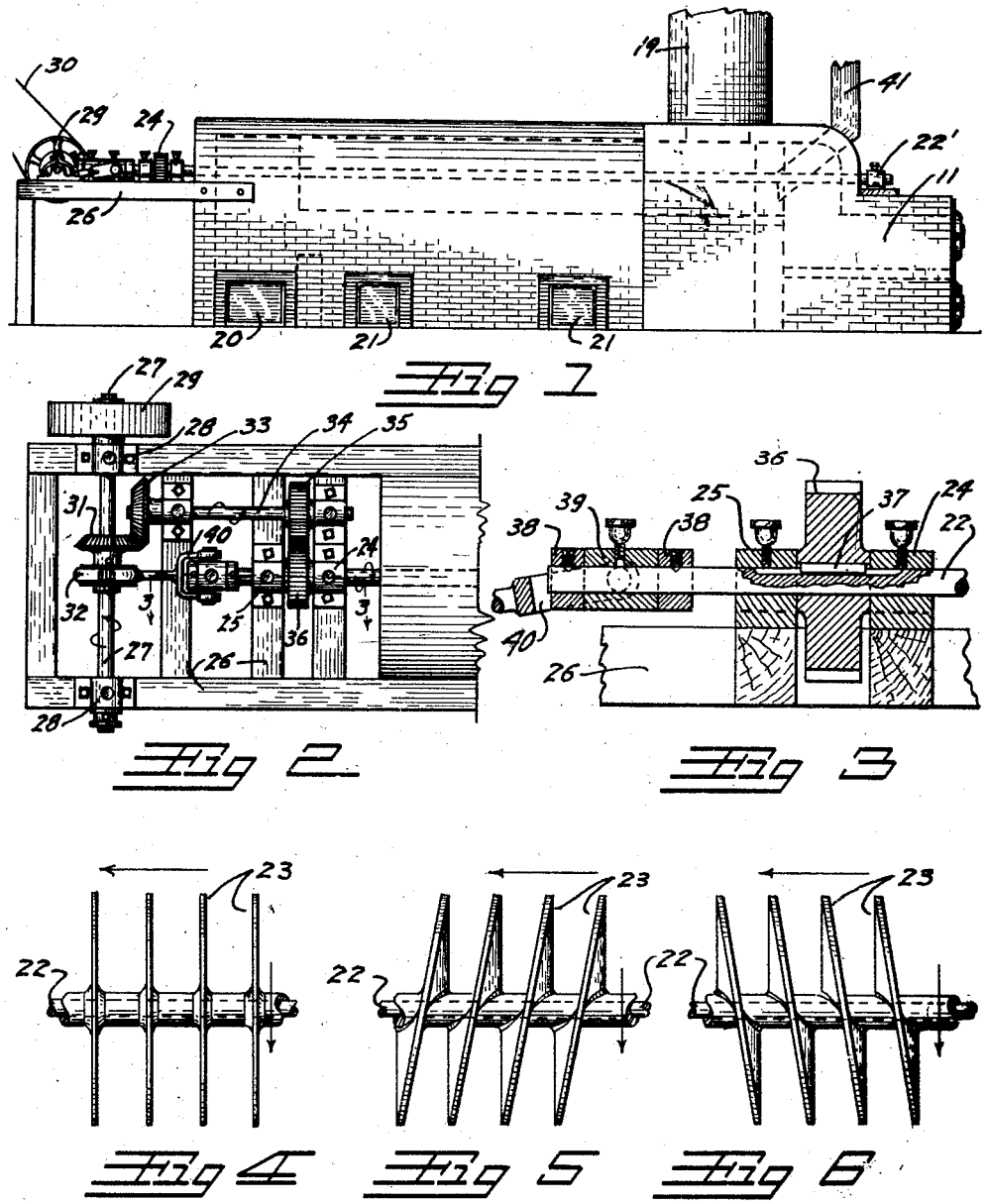
INVENTOR.
ARTHUR C. DAMAN
BY
ATTORNEY.

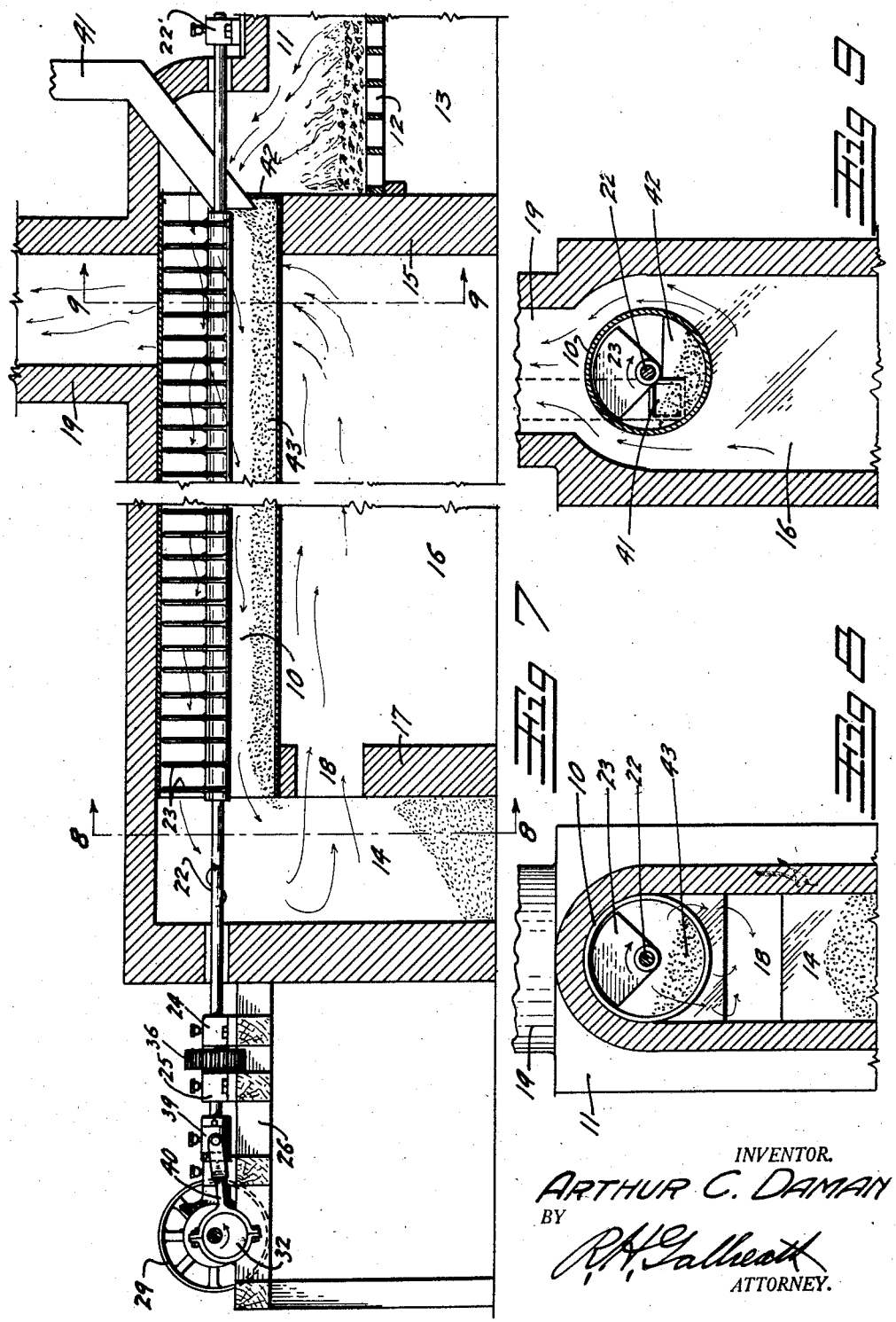

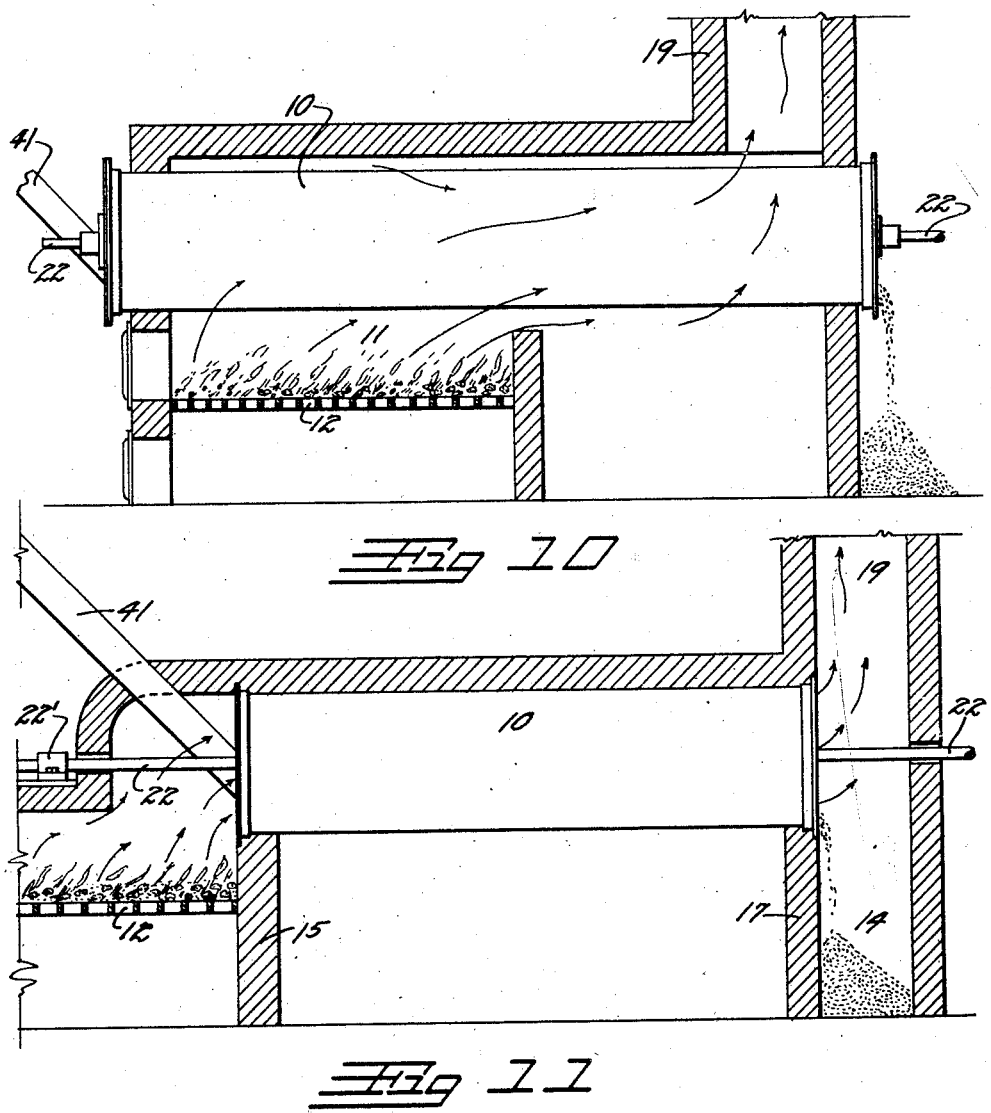

Patented May 19, 1925.

1,538,385

UNITED STATES PATENT OFFICE.

ARTHUR C. DAMAN, OF DENVER, COLORADO.

DRIER.

Application filed April 24, 1923. Serial No. 634,345.

*To all whom it may concern:*

Be it known that I, ARTHUR C. DAMAN, a citizen of the United States of America, residing at Denver, in the county of Denver and State of Colorado, have invented certain new and useful Improvements in Driers, of which the following is a specification.

This invention relates to driers and while particularly adaptable to the drying of crushed ore during treatment, it will be found valuable in many other continuous drying applications.

The principal object of the invention is to provide a continuous drying apparatus which will avoid what is commonly termed "dusting," that is, a device which will handle finely powdered material without sufficiently agitating it to cause the fine particles to become suspended in the atmosphere of the drier where they may become burned or be carried away in the gases from the drying chamber.

A further object is to provide a drier which will precipitate any powdered material which may be caught by the gases before they leave the drier.

Other objects and advantages reside in the detail construction of the invention, which result in simplicity, economy and efficiency, and which will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of a form of construction involving the invention.

Fig. 2 is an enlarged plan view of the operating mechanism located at the rear of the machine.

Fig. 3 is a detail section taken on the line 3—3, Fig. 2.

Figs. 4, 5 and 6 are detail views of various arrangements of scrapers which might be employed in the device.

Fig. 7 is an enlarged longitudinal section through the drier as shown in Fig. 1.

Fig. 8 is a vertical cross section taken on the line 8—8, Fig. 7.

Fig. 9 is a similar section taken on the line 9—9, Fig. 7.

Figs. 10 and 11 are longitudinal sections through alternate arrangements of the drier.

Let the numeral 10 designate a horizontal cylindrical drum, which is supported by and enclosed within suitable walls of fire brick or other material as indicated. Opening into the forward end of the drum 10 is a fire box 11, provided with grate bars 12 and an ash pit 13. The rear end of the drum 10 opens to a collecting chamber 14 for the reception of the dried material.

Supporting the forward end of the drum 10, is a partition wall 15, which separates the fire box 11 from a settling chamber 16, located beneath the drum 10. Located below the rearward extremity of the drum 10 is a cross partition 17, which separates the collecting chamber 14 from the settling chamber 16.

Settling chamber 16 communicates with the collecting chamber 14, through an opening 18, between the drum 10 and the partition 17, and opens to the atmosphere through a chimney 19.

The hot combustion gases from the fire box 11, pass through the drum 10, into the collecting chamber 14; through the opening 18, into the settling chamber 16 and up the chimney 19. The gases in chamber 14 are caused to move sharply downward and make an abrupt turn into the opening 18. The relatively heavy solids which may be carried by the gases are caused, by this motion, being thrown downward into the collecting chamber 14.

The velocity of the gases, upon reaching the enlarged settling chamber 16, is sharply diminished and any remaining suspended material is precipitated therein. The collecting chamber 14 is cleaned through a clean-out door 20 in the exterior wall. Clean-out doors 21 open to the settling chamber 16.

Extending concentrically through the drum 10, is a shaft 22, which carries a series of parallel, uniformly-spaced, segment-shaped scrapers 23. The forward extremity of shaft 22 is carried in a journal box 22', in this instance supported on the fire box 11. The rearward extremity of shaft 22 is carried in two similar journal boxes 24 and 25, supported on a suitable frame 26.

A drive shaft 27, positioned at right angles to the shaft 22, is also carried by frame 26 in suitable journal boxes 28. Drive shaft 27 may be driven by means of a belt pulley 29 and a belt 30, or in any desired manner. Fixed to the drive shaft 27 is a miter gear 31 and an eccentric 32. A miter gear 33, carried by a countershaft 34, meshes with the miter gear 31 and supplies power to a spur gear 35, also secured to the countershaft 34, which meshes with a similar spur gear 36 which is splined on the shaft 22, as shown at 37, Fig. 3. Gears 35 and 36 are equal in diameter, therefore, since the gears 31 and 33 are miter gears, the shafts 27 and 22 will revolve at the same speed.

Fixed, between two set collars 38 on the rearward extremity of shaft 22, is a rotatably mounted sleeve 39, which is connected, by means of a yoke 40, to the eccentric 32. Rotation of the drive shaft 27 will therefore cause the shaft 22 to rotate and reciprocate simultaneously, one complete reciprocation being made to each revolution thereof.

Scrapers 23 are fixed to the shaft 22 so that when they are on the upper side thereof, the shaft will be moving longitudinally toward the front of the drier or feed end.

The material to be dried is fed into the drum 10 by means of a suitable chute 41. A plate 42 closes the lower portion of the front end of the drum 10 in order to prevent any of the said material from falling into the fire box 11.

The action of the drying is as follows:

The material being dried, indicated at 43, lies in the bottom of the drum. The scrapers 23, as they descend into the material, simultaneously move toward the rear of the drum and gently push the material toward the rear of the drum or discharge. The rearmost scraper 23, scrapes the material from the drum 10 into the collecting chamber 14, and the foremost scraper 23 moves the material away from the chute 41 to allow fresh material to be discharged into the drum. It will be noted that the scrapers carry the material rearward without rolling or dropping it so that "dusting" is reduced to a minimum.

The scrapers 23, as they move through the gas passage above the material, act as baffles to retard and keep the heated gases down in close proximity to the material being dried, and as they move through the material they act to force the draft of the gases away from the material and create a quiescent zone directly above the material so that, should any agitation occur in the material while it is being moved, the resultant dust, if any, will not be drawn away by the draft of the gases.

The scrapers 23, being constantly in the path of the hot gases, become heated and act to radiate heat to the material and assist in the drying as they pass through. It has been found advantageous to have the spacing of the scrapers 23 to slightly differ from the throw of the eccentric 32, in order that the scrapers will not enter the furrows left in the material by the last passage of the scrapers. In this way a secondary agitation or mixing effect is obtained, as the blades each time enter the material at a new point and fill the material into the furrows left by the last passage.

The preferred form of mounting the scrapers 23 is at right angles to the shaft 22, as shown in Fig. 4. Various mixing effects can be obtained, however, by varying the angle of the scrapers with the shaft as shown in Figs. 5 and 6. These views show the scrapers as they would appear looking up from the bottom of the drum. The arrows indicate the direction of movement of the scrapers at this point.

In Fig. 5 the angle is such as would move material to the right or towards the forward or feed end of the drum were the shaft not reciprocating, but when this action is combined with the rearward motion of the shaft itself, it serves to retard the material in its passage through the drum and increase the mixing or agitation effect.

In Fig. 6 the angle is such as would move material to the left or towards the rearward or discharge end of the drum were the shaft not reciprocating and, when this action is added to the endwise movement of the shaft itself, it acts to increase the speed of travel of the material through the drum and also to increase the agitation of the material as it creates a plow-like effect.

With any of the three forms described the speed of flow of the material can be varied as desired by changing the throw of the eccentric 32.

Gear 36 is prevented from revolving on the shaft 22 by a key 37. The shaft is free to move longitudinally, however, since a long groove is provided therein for the travel of the key 37.

For some materials, it is not desirable to have the fire pass directly into the drum and the heat can be only applied to the exterior thereof. Such an arrangement is shown in Fig. 10. The scraping mechanism above described would be equally applicable to this type of drier.

Should it not be desired to return the gases under the drum, the chimney could be moved to a position directly over the collecting chamber 14 and the opening 18 closed as shown in Fig. 11.

While, a specific form of the improvement has been described and illustrated herein, it is desired understood that the same may be varied, within the scope of the appended claims, without departing from the spirit of the invention.

Having thus described the invention, what is claimed and desired secured by Letters Patent is:—

1. A drier, comprising, a stationary, horizontally disposed, drum; a shaft passing through said drum; scrapers secured to said shaft and means for simultaneously rotating and reciprocating said shaft.

2. A drier, comprising a stationary, horizontally disposed, cylindrical drum; means for supplying heat to said drum; a shaft passing through said drum; scrapers secured to said shaft and means for simultaneously rotating and reciprocating said shaft, said means comprising a drive shaft carrying an eccentric and gears operatively connected to said first mentioned shaft.

3. A drier, comprising a stationary, horizontally disposed, cylindrical drum; a fire box opening into the forward extremity of said drum; a collecting chamber opening into the rearward extremity of said drum; a settling chamber below said drum and opening to a chimney, said settling chamber communicating with said collecting chamber; means for admitting material to be dried to the forward extremity of said drum and means for causing said material to travel through said drum.

4. In a drier, comprising a horizontally disposed drum; a shaft passing longitudinally through said drum; spiral conveyor blades secured to said shaft, said blades only partially surrounding said shaft and means for revolving said shaft.

5. A drier comprising a horizontally disposed drum; a fire box opening to one end of said drum; a settling chamber opening to the opposite end of said drum; a second settling chamber opening to said first settling chamber beneath said drum and a stack communicating with said second settling chamber around said drum and adjacent said fire box.

6. A drier comprising, a drum; a shaft passing longitudinally through said drum, said shaft being mounted so that it will move circumferentially and axially; scrapers secured to said shaft; means for rotating said shaft and means for reciprocating said shaft.

7. A drier comprising a drum; a rotatably mounted shaft passing longitudinally through said drum; conveyor blades secured to said shaft within said drum; means for heating said drum; means for admitting material to be dried, at one extremity and a receiving chamber opening to the other extremity of said drum.

In testimony whereof I affix my signature.

ARTHUR C. DAMAN.